(12) United States Patent  
Quakernack et al.

(10) Patent No.: US 11,558,217 B2
(45) Date of Patent: Jan. 17, 2023

(54) BUS CONVERTER

(71) Applicant: WAGO Verwaltungsgesellschaft mbH, Minden (DE)

(72) Inventors: Frank Quakernack, Bielefeld (DE); Hans-Herbert Kirste, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 299 days.

(21) Appl. No.: 16/694,432

(22) Filed: Nov. 25, 2019

(65) Prior Publication Data

US 2020/0092133 A1 Mar. 19, 2020

Related U.S. Application Data

(63) Continuation of application No. PCT/EP2018/062971, filed on May 17, 2018.

(30) Foreign Application Priority Data

May 24, 2017 (DE) ..................... 10 2017 208 824.9

(51) Int. Cl.
*H04L 12/40* (2006.01)
*H04L 12/46* (2006.01)
(Continued)

(52) U.S. Cl.
CPC .. *H04L 12/40019* (2013.01); *H04L 12/40032* (2013.01); *H04L 12/422* (2013.01);
(Continued)

(58) Field of Classification Search
CPC ........... H04L 12/40019; H04L 12/4625; H04L 12/40032; H04L 12/422; H04L 12/5601; H04L 2012/5681; H04L 2012/4026
See application file for complete search history.

(56) References Cited

U.S. PATENT DOCUMENTS

| 5,472,347 A | 12/1995 | Nordenstrom et al. |
| 6,839,347 B1 * | 1/2005 | Ishida ..................... H04L 47/62 370/389 |

(Continued)

FOREIGN PATENT DOCUMENTS

| CN | 102170430 A | 8/2011 |
| CN | 103293995 A | 9/2013 |

(Continued)

OTHER PUBLICATIONS

International Search Report dated Aug. 31, 2018 in corresponding application PCT/EP2018/062971.

(Continued)

*Primary Examiner* — Rasheed Gidado
(74) *Attorney, Agent, or Firm* — Muncy, Geissler, Olds & Lowe, P.C.

(57) ABSTRACT

A device for coupling a fieldbus to a local bus for connection to at least one data bus subscriber, the device comprising a first unit that is connectable to the fieldbus and is adapted for sending and receiving data via the fieldbus; a second unit that is connectable to the local bus and is adapted for sending and receiving data via the local bus in at least one data packet; a data management unit that is connected to the first unit and the second unit, wherein the data management unit is adapted for transferring first symbols from data received via said first unit to said second unit in a sequence-dependent manner; and wherein the second unit is adapted to send at least one data packet including the first symbols on the local bus. In addition, a corresponding method for transferring data is described.

19 Claims, 4 Drawing Sheets

(51) Int. Cl.
*H04L 12/54* (2022.01)
*H04L 12/42* (2006.01)
*H04L 12/70* (2013.01)

(52) U.S. Cl.
CPC ...... *H04L 12/4625* (2013.01); *H04L 12/5601* (2013.01); *H04L 2012/4026* (2013.01); *H04L 2012/5681* (2013.01)

(56) References Cited

U.S. PATENT DOCUMENTS

| | | | |
|---|---|---|---|
| 7,852,857 B2 | 12/2010 | Beckhoff et al. | |
| 8,291,142 B2 | 10/2012 | Kuschke et al. | |
| 8,832,474 B2* | 9/2014 | Noller | H04L 12/403 |
| | | | 713/320 |
| 8,898,364 B2 | 11/2014 | Kuschke et al. | |
| 10,218,464 B2 | 2/2019 | Buchali et al. | |
| 10,296,483 B2* | 5/2019 | Vogt | G05B 19/4185 |
| 10,496,588 B2* | 12/2019 | Buesching | G06F 13/4265 |
| 2004/0063438 A1 | 4/2004 | Hsu et al. | |
| 2005/0114577 A1* | 5/2005 | Beckhoff | G05B 19/042 |
| | | | 710/110 |
| 2008/0123522 A1* | 5/2008 | Elliott | H04L 12/40202 |
| | | | 370/220 |
| 2011/0283027 A1* | 11/2011 | Buesching | H04L 12/40032 |
| | | | 710/105 |
| 2015/0156286 A1* | 6/2015 | Blair | H04L 69/08 |
| | | | 709/201 |
| 2016/0217242 A1* | 7/2016 | Beaubien | G06F 30/34 |
| 2017/0171000 A1* | 6/2017 | Anderson | H04L 27/10 |
| 2017/0351573 A1* | 12/2017 | Ueda | G06F 11/1052 |
| 2018/0013582 A1* | 1/2018 | Sotriffer | H04L 12/4625 |

FOREIGN PATENT DOCUMENTS

| | | |
|---|---|---|
| CN | 106165349 A | 11/2016 |
| DE | 19955330 A1 | 5/2001 |
| DE | 10304637 A1 | 8/2004 |
| DE | 102008018633 A1 | 10/2009 |
| EP | 1049019 A1 | 11/2000 |
| EP | 3086498 A1 | 10/2016 |
| WO | WO2008052668 A2 | 5/2008 |
| WO | WO2013184115 A1 | 12/2013 |

OTHER PUBLICATIONS

International Preliminary Report on Patentability in corresponding application PCT/EP2018/062971.
Chinese Office Action dated Jun. 1, 2021 in corresponding application 201880034583.6.

* cited by examiner

BUS CONVERTER

This nonprovisional application is a continuation of International Application No. PCT/EP2018/062971, which was filed on May 17, 2018, and which claims priority to German Patent Application No. 10 2017 208 824.9, which was filed in Germany on May 24, 2017, and which are both herein incorporated by reference.

BACKGROUND OF THE INVENTION

Field of the Invention

The present invention relates to a device for connecting a fieldbus to a local bus and in particular to a bus converter for converting data from a data stream of a fieldbus to a data stream of a local bus.

Description of the Background Art

Devices for connecting two bus systems are typically used in automation systems.

Automation systems are used in particular for controlling industrial plants, buildings and means of transport. Usually, a plurality of sensors and actuators are required in order to control an automation system. These sensors and actuators monitor and control the process that the system carries out. These different sensors and actuators of an automation system are often referred to as automation devices.

These automation devices may either be connected directly to a controller of the automation system, or may first be connected to input and output modules, often referred to as I/O modules. These may in turn be connected directly to the controller. These automation devices may either be integrated directly into the I/O modules or may be connected to them via a wired or wireless connection.

The control of an automation system is usually accomplished using one or more programmable logic controllers (PLCs). The PLCs may be arranged hierarchically or decentrally in an automation system. There are different performance classes for the PLCs, so that they may be subject to different controls and rules depending on the computing and memory capacity. In the simplest case, a PLC has inputs, outputs, an operating system (firmware) and an interface via which a user program may be loaded.

The user program determines how the outputs are switched as a function of the inputs. The inputs and outputs may be connected to the automation devices and/or the I/O modules, and the logic stored in the user program may be used to monitor or control the process that the automation system performs. The sensors provide monitoring of the process and the actuators provide control of the process. The controller may also be referred to as a central controller or central unit and controls at least one automation device or I/O module connected to the controller.

However, it is very laborious to directly connect the automation devices with at least one control system or to connect the I/O modules with the at least one control system in the form of a parallel wiring, i.e. running a line from each automation device or each I/O module to the higher-level control system. Especially with the increasing degree of automation of an automation system, the cabling effort increases in the case of parallel wiring. This involves a great deal of effort in project planning, installation, commissioning and maintenance.

For this reason, typically in contemporary automation technology, bus systems are used that allow connecting the automation devices or the I/O modules to the control system. Such subscribers of a bus system are also referred to as bus subscribers. Because data is exchanged on the bus system, the bus subscribers are often also called data bus subscribers. In order to further simplify the connection of the individual automation devices or I/O modules with the bus system, currently, individual groups of automation devices or I/O modules are often first connected to one another to form a local bus system using a specialized local bus, and then at least one subscriber of this local bus is connected to the bus system that is connected to the control system. In this case, the local bus system may differ from the bus system that is used to establish the connection with the control system.

In a group of local bus subscribers, the subscriber that is connected to the bus system of the control system is often referred to as a local bus master. Alternatively, the term "head-end station" of the local bus system is also used. In contrast to the other local bus subscribers, this local bus master may contain additional logics, circuits or functionalities that are necessary for connecting to the bus system of the control system. The local bus master itself may also contain a PLC. This subscriber may also have logics and circuits for conversion between the two bus systems. The local bus master accordingly may also be designed as a gateway or bus converter, and ensures that the data available in the format of one bus system is converted into the format of the local bus system and vice versa. Usually, but not necessarily, the local bus master is specialized for connecting the local bus to the higher-level bus.

The local buses that are used are usually adapted to the special usage requirements of the automation devices or I/O modules, or take into account the specific hardware design thereof. In this case, the groups of automation devices or I/O modules of the local bus system usually form a subgroup of the automation system for executing a specific task in the process that the automation system carries out. The data exchanged on the buses for the process is often referred to as local bus data or process data, because this data contains information for regulating or controlling the process that the automation system carries out. This data may comprise, among other things, measurement data, control data, status data and/or other information. Depending on the bus protocol used, this data may be prepended ("header") or appended ("tail") to other data. This other data may contain information regarding the data, or information regarding internal communication on the local bus. In this case, a multiplicity of different information is known that may be prepended or appended to the data depending on the bus protocol used. The local bus subscribers connected to a local bus may also be referred to as data bus subscribers because they exchange data on the local bus. A data bus subscriber in this case is used to control or monitor a process, in particular by outputting control signals, for example to actuators, and/or by receiving measurement signals, for example from sensors.

The data bus subscriber converts the control signals and/or measurement signals into data for the local bus or vice versa.

A ring bus is a specialized form of a local bus, as is known for example from U.S. Pat. No. 5,472,347 A. In a ring bus, the data bus subscribers, for example the automation devices or I/O modules, are each respectively connected to their directly adjacent data bus subscribers, and data is forwarded in sequence from one data bus subscriber to another. The data transmitted on the local bus may also be referred to as local bus data. This means that the data is not sent to all data bus subscribers simultaneously, but in sequence, with a data bus subscriber receiving data from its upstream data bus subscriber and forwarding data to its downstream data bus subscriber. Between receiving the data and forwarding it, the data bus subscriber may process the received data. When the data has reached the last data bus subscriber in the sequence, the data from the last data bus subscriber is returned back to the first data bus subscriber. The return may take place via all data bus subscribers or by bypassing them via a bypass line. The ring bus thus has a downstream flow and an upstream flow of data. The data in a ring bus is usually transmitted in the form of data packets that pass through all data bus subscribers.

In a ring bus, a data packet is passed from one data bus subscriber to another. At any given time, a data bus subscriber receives only part of the data packet from its upstream data bus subscriber. When the data bus subscriber has processed the data contained in this part, the part is forwarded to the downstream data bus subscriber and at the same time a new part of the data packet is received from the upstream data bus subscriber. In this way, all parts of the data packet pass sequentially through all data bus subscribers.

In the known ring bus systems or other local bus systems, bus converters are used that convert the data streams from the control system into a local bus-compliant format.

Usually, high-performance controllers are used that sort the data originating from the control system in such a way that this data is available in a local bus-compliant format, corresponding the sequence of the data bus subscribers on the local bus. In other words, the sequence of the data after sorting corresponds to the sequence in which the data bus subscribers are arranged on the local bus. This sorting makes addressing unnecessary in such bus systems, because the data is arranged according to the physical position of the data bus subscribers in the local bus. For example, the data directed to the first data bus subscriber is set to the first position in the local bus-compliant format, the data directed to the second data bus subscriber in the local bus is set to the second position in the local bus-compliant format, and so forth. To ensure that this conversion and in particular the sorting takes place without major delays, in known systems high-performance, high-clocked controllers are usually used. But even with these high-performance controllers, a delay may only be minimized to a certain degree.

High-performance controllers also have various drawbacks; the controllers usually have to be actively cooled, have a high power consumption and are expensive.

SUMMARY OF THE INVENTION

It is therefore an object of the present invention to provide a device and a corresponding method with which the conversion of data from a fieldbus to a local bus and in particular to a ring bus may be carried out almost without delay and the conversion does not require complex hardware.

The device according to an exemplary embodiment of the invention, which may also be referred to as a bus converter or gateway, has a first unit that is connectable to a fieldbus and is adapted for sending and receiving data via the fieldbus. A fieldbus may be any bus that may be used in an automation system and that may be used to establish a connection to the control system, for example the PLC.

The connection to the control system may also be established via several different fieldbuses; the entire connection between the first unit according to the invention and the control system should be understood as a single fieldbus, even if this connection is formed of a plurality of different fieldbuses. The first unit according to the invention is adapted to be connected to the fieldbus. For this purpose, the first unit may have an interface that is designed for the fieldbus. The interface may establish a wired or wireless connection with the fieldbus. A data stream may be received from the fieldbus, and a data stream may be output to the fieldbus, via the interface of the first unit or via the first unit. The first unit may also be called a fieldbus core (FBC) due to its connectivity to the fieldbus. The FBC may be designed as an individual arithmetic logic unit, as a computing core, or as a computing circuit that is designed as a digital logic circuit that in particular is designed as at least a part of a semiconductor chip. The FBC may be implemented for example in an application-specific integrated circuit (ASIC) or in a field programmable gate array (FPGA), or in another programmable logic device (PLD), or a discrete gate or transistor logic.

Additionally, the device according to the invention also has a second unit that is connectable to a local bus, in particular a ring bus, and is adapted for sending and receiving data via the local bus in the form of at least one data packet. The data packets may also be referred to as data telegrams. For example, a data packet has a header, a payload, and advantageously, a checksum. A data packet is advantageously a communication data packet or a process data packet.

A communication data packet does not contain any process data. Advantageously, a communication data packet contains data in particular for programming and/or for controlling and/or for monitoring and/or for identifying at least one data bus subscriber. Advantageously, the communication data packet has an address that is mapped to at least one data bus subscriber. Preferably, the data bus subscriber is designed to evaluate the address.

A process data packet comprises process data that are sent and/or received by the data bus subscribers of the local bus. Advantageously, the process data packet does not have an address for transmitting the process data to or from a data bus subscriber in the local bus. In the process data packet, for example, the process data is arranged in such a way that data bus subscribers may recognize the process data associated with the respective data bus subscriber based on the respective position of the process data in the process data packet, for example one or more bits within an associated contiguous data block (1 byte). Advantageously, the process data packet has an identifier (IDE) that is mapped to the type of data packet, i.e. the process data packet, and that the data bus subscriber is able to identify. The process data may also be referred to as local bus data.

The protocols used on the fieldbus and the local bus may differ, so that the fieldbus-compliant format cannot be sent without being converted for the local bus, and conversely the local bus-compliant format cannot be sent without being converted for the fieldbus.

The second unit, according to the invention, is adapted to be connected to the local bus. For this purpose, the second unit may have an interface that is designed for the local bus. The interface may establish a wired or wireless connection with the local bus. A data packet may be sent on the local bus, and a data packet may be received from the local bus, via the interface of the second unit or via the second unit. The second unit may also be called a local bus core (LBC) due to its connectivity to the local bus. The LBC may be designed as an individual arithmetic logic unit, as a computing core, or as a computing circuit that is designed as a digital logic circuit that in particular is designed as at least a part of a semiconductor chip. The LBC may be implemented in an ASIC, or in an FPGA, or in another PLD, or in a discrete gate or transistor logic.

The device according to the invention also comprises a data management unit that is connected to the first and second units. The data management unit may also be referred to as the management unit (MU), in which case it may be referred to as the fieldbus management unit (FMU) or local bus management unit (LMU) according to the direction in which it functions.

The connection may advantageously be a parallel bus between the units, that for example is designed as a 32-bit parallel bus. The data management unit is adapted for sequence-dependently transferring first symbols, from data received via the first unit (FBC), to the second unit (LBC). Sequence-dependent in this context means that symbols are transferred to the second unit according to the sequence in which they were received from the first unit. The sequence accordingly conforms to the incoming symbols. For example, the symbols received via the fieldbus may be transferred to the second unit in a correct sequence. For example, the sequence of the symbols received via the fieldbus is unchanged or is predominantly unchanged, i.e. the symbols are also transferred to the second unit in the order in which they are received on the fieldbus. Thus, there is no sorting, because the sequence of the symbols is maintained. The symbols may be said to be transferred one-to-one. The transferred symbols may be process data received from the control system via the fieldbus in a fieldbus-compliant format. The fieldbus-compliant format may comprise process data as well as other data that is prepended to, appended to, or superimposed on, the process data. For example, the other data may be bus-specific and the process data may be bus-neutral. In a fieldbus-compliant format, other data, which may be referred to as the header, and which is usually used for purposes of addressing and control, is usually prepended to the process data. Other data may also be appended to the process data, which may be used for error detection. The process data is a component of the payload part of the fieldbus-compliant format. The process data are designed to cause a control, regulation or other reaction by the data bus subscribers of the local bus. For example, fieldbus telegrams may be received via the fieldbus in which the process data is contained in the form of symbols with a fixed number of bits and in which the symbols are arranged in a first sequence in the fieldbus telegram.

The data management unit may be adapted to transfer the symbols from the fieldbus telegram to the LBC in a second sequence. Preferably, the first and second sequences of the symbols coincide. The data management unit may be adapted to transfer only the process data. In other words, the data management unit or the first unit may be adapted to select the process data from the fieldbus-compliant format or the fieldbus telegram. The data management unit may be designed as an individual arithmetic logic unit, as a computing core, or as a computing circuit that is designed as a digital logic circuit that in particular is designed as at least a part of a semiconductor chip. The data management unit may be implemented in an ASIC, or in an FPGA, or in another PLD, or in a discrete gate or transistor logic. The FBC, the LBC and the data management unit may also be implemented together in an ASIC, or in an FPGA, or in a PLD, or in a discrete gate or transistor logic. Particularly after the transfer, the local bus master may use a manipulation unit to modify the process data in a targeted manner.

For this purpose, the local bus master advantageously comprises instructions that effect a modification of the process data.

After the first symbols have been transferred to the LBC and a data packet has been generated that carries the transferred symbols, this data packet may be sent on the local bus for example in parts of 8 bits, i.e. 1 byte, and the individual parts of the data packet may pass successively through the data bus subscribers of the local bus. Thus, at any given time, a data bus subscriber receives only a part of the data packet from its upstream data bus subscriber. When the data bus subscriber has processed the process data contained in this part, the part is forwarded to the downstream data bus subscriber, and at the same time, a new part of the data packet is received from the upstream data bus subscriber. The LBC and the data bus subscribers of the local bus may be clock-synchronous, so that when the LBC sends a new part of the data packet on the local bus, the respective data bus subscribers also send the currently-available part of the data packet to their respective downstream data bus subscriber. The last data bus subscriber in the local bus may send the part currently available to it back to the LBC, either again through all data bus subscribers or via a bypass line. The LBC in this case may be synchronized to the clock of the fieldbus, i.e. to the clock in which the FBC receives fieldbus telegrams from the fieldbus.

The LBC may be adapted in this case to output the start of the data packet on the local bus before the first symbols have been received completely via the FBC.

The device according to the invention enables an accelerated conversion of a data stream from a fieldbus to a local bus and vice versa through the sequence-dependent transfer of process data. The conversion of all process data necessary for the data bus subscribers of the local bus thus occurs in a bus-neutral fashion and with minimal delay and minimal jitter. Because the conversion is always sequence-dependent, it is advantageous that the data bus subscribers know about the sequence used; the sequence may deviate from the sequence of the physical positions of the data bus subscribers in the local bus. Knowledge of the sequence allows the data bus subscribers to be programmed in such a way that they may extract the process data directed to them from the data packet without having to sort the process data in order to do so. The programming of the data bus subscribers may take place, for example, with a communication data packet that the second unit sends before the data packet that carries the process data.

The data management unit can be adapted to prepend and/or append and/or interpolate additional symbols into the first symbols. It is conceivable that the other symbols are blank symbols that are used to monitor the integrity on the local bus, for example if the local bus does not allow any gaps in the symbols or if the LBC expects a certain number of symbols but this number does not correspond to the number of the first symbols. The data management unit may also be adapted to interpolate additional symbols into the first symbols. The data management unit may also be adapted to remove unneeded symbols from the first symbols.

The data management unit can temporarily store the first symbols. For example, the data management unit may temporarily store the transferred symbols in a memory to make them available to a controller for evaluation.

In this case, the controller is not set up to transfer data between the FBC and the LBC. Temporary storage makes it possible, for example, to check the transferred symbols without interrupting the data streams. Moreover, temporary storage also enables a delta comparison of symbols to be carried out before they are sent on the local bus and after they are received from the local bus. For the temporary storage of the transferred symbols, the device according to the invention may have at least one volatile or non-volatile memory, for example a pseudo static dynamic random access memory. The skilled person understands, however, that any other component for storing data may also be used for temporary storage. This component need not itself be part of the device, but may be maintained externally from it, or may be an additional module. The device and in particular the data management unit need only have access to the component, for example, a memory.

The LBC is adapted to generate a data packet that comprises the first symbols, and to send the data packet on the local bus. The data packet may be sent on the local bus in symbol form. The LBC may make all necessary protocol-specific adjustments in order to send the data packet on the local bus. The LBC is additionally adapted to receive a data packet from the local bus; the received data packet may contain second symbols that differ from the first symbols. The LBC is also adapted to manipulate the first and/or second symbols. This manipulation may be bitwise and may be used to adjust the first and second symbols according to the respective direction of transmission.

The data management unit can function as a master unit. The data management unit has a first master interface connected to a slave interface of the FBC, and the data management unit has a second master interface connected to a slave interface of the LBC. This means that the data management unit controls the process of transferring the first symbols between the FBC and the LBC by requesting symbols from the FBC via the first master interface and transferring the requested symbols to the LBC via the second master interface.

The data management unit can comprise a first data transfer unit, DTU0; DTU0 is adapted to read the first symbols from a buffer of the FBC via the first master interface based on first instructions and to write them into a buffer of the LBC via the second master interface. DTU0 is additionally adapted to send the validity of the written first symbols to the LBC via the second master interface. The validity is indicated, for example, by a control signal, an identifier, a flag, or another code. Only when the validity is indicated are the first symbols sent from the LBC on the local bus. If there is no determination of validity, then for example the first symbols last received as valid may be transferred and sent again. Alternatively, in this case, default symbols or blank symbols may also be sent, which bring about either no or a defined control, regulation, or the like by the data bus subscribers. This prevents incorrectly-transferred first symbols from being sent on the local bus, which could lead to incorrect control, regulation, etc. of the data bus subscribers or the actuators connected to them. The data management unit may also comprise a second data transfer unit, $DTU_1$, which is adapted to read second symbols from an LBC buffer via the second master interface based on second instructions, and to write second symbols to an FBC buffer via the first master interface. DTU0 is accordingly adapted to transfer symbols from the fieldbus to the local bus, while $DTU_1$ is adapted to transfer symbols from the local bus to the fieldbus. DTUs 0 and 1 are preferably implemented as separate hardware, so that there is a separation between the transfer directions; the hardware separation may allow parallel processing in both transfer directions, i.e. a simultaneous transfer in both directions may be guaranteed. The $DTU_1$ may be additionally adapted to write a part of the second symbols into the buffer of the FBC only if the LBC sends the validation of the second symbols. This has the advantage that sending the second symbols to the control system via the fieldbus may be delayed until the validity of the second symbols has been checked. The reason for this is that the FBC only sends the second symbols from the buffer via the fieldbus when they are complete, for example when the buffer has filled to a certain extent, thus for example when the fieldbus telegram is complete. Additionally, the data management unit may also be adapted to transfer the second symbols based on a control signal of the LBC.

Only when this control signal is present are the second symbols transferred.

The first and second data transfer units $DTU_{0,1}$ may also be referred to as copy units. $DTU_0$ copies process data—selected from a data stream—that has been received into the buffer of the LBC via the fieldbus. $DTU_1$ copies process data—selected from a data stream—that was received via the local bus into the buffer of the FBC. The FBC and LBC then each send their respective buffer contents to the fieldbus or local bus. The FBC and LBC do not operate bus-neutrally in this case, because they pack the corresponding buffer contents into a fieldbus- or local bus-compliant format. Thus, the FBC and the LBC are adapted to the respective bus systems. These units may therefore be designed to be replaceable so that they may be changed according to the bus systems used. However, the copy units are bus-neutral because they only copy the process data without taking other bus-specific information into account. The copy units copy the first and second process data sequence-dependently. This means that the copy units copy the process data in the same sequence in which it is taken from the data streams. This means, for example, that the first process data are copied into the LBC in the sequence in which they were received via the fieldbus. In reverse sequence, this means that the second process data is copied to the FBC in the sequence in which it was received via the local bus. Thus, the copy units copy the process data between the FBC and the LBC without changing the sequence of the data.

In an exemplary embodiment of the device according to the invention, the device further comprises a computing unit for controlling the FBC and/or the data management unit and/or the LBC and for evaluating the first and second symbols. The computing unit may be a microcontroller connected to the FBC, the LBC and/or the data management unit via a parallel bus. For example, the bus may be a 32-bit parallel bus.

The computing unit may be adapted to program and modify the instructions according to which the FBC, LBC, and/or data management unit operate. In addition, the computing unit may be adapted to receive data from the data management unit via the fieldbus or from the local bus and to read and evaluate it. Additionally, the computing unit may be adapted to read and evaluate the first symbols that the data management unit has stored temporarily, i.e. the buffered process data. The computing unit may also be adapted to control the LBC, in particular to write control data to the LBC for manipulating the process data.

The first unit can be adapted to check the validity of the data received via the fieldbus. The first unit may also be adapted to signal the validity of the received data. The second unit may be adapted to check the validity of the data received via the local bus. The second unit may also be adapted to signal the validity of the received data. For example, data may only be transferred if a corresponding validation has been signaled. The data streams may be validated, for example, using CRC checks. Both or only one unit may be adapted to check the corresponding validity. The first and second units may be adapted not to output data to the fieldbus or local bus if the respective other unit does not signal that the transferred data or received data is valid. It may happen that the fieldbus connected to the first unit requires a continuous transmission of data, i.e. sending data without time interruption, in which case the last data recognized as valid by the first unit may be sent on the fieldbus if the validity of the present data is not otherwise indicated.

The device can also have a clock and/or timer for generating an internal timing and/or for transmitting it to the data bus subscribers of the local bus. Moreover, the device according to the invention may have a synchronization unit for synchronizing the clock and/or timer to the clock of the fieldbus. For example, the synchronization unit may be adapted to detect transitions in the data streams received from the fieldbus and may use them to control the clock frequency of the internal clock signal and to set a defined phase relationship of the internal clock signal to the detected transitions.

The timer of the device according to the invention may thus be synchronized, for example, with a timer that the control system uses. The device according to the invention may also transmit this timing to the data bus subscribers of the local bus. This timing may be used when sending parts of the data packet on the local bus.

The fieldbus can be ARCNET, AS-Interface, BACNet, BITBUS, ControlNet, Profibus/Profinet, EtherCAT, Ethernet/IP, Interbus, AS-Interface, CIP protocols, CANopen, CC-Link, Modbus, Modbus/TCP, P-NET, Lonworks, SERCOS, BACnet, Bitbus, Measurement Bus, Powerlink, DeviceNet, RTPS, DALI, EIB, FAIS-Bus, FIB-Bus, FlexRAY, HART, KNX, LCN, LIN, LON, P-Net, T-Bus, or VARAN. However, it is also conceivable that the fieldbus may use a different bus protocol. The protocol that the fieldbus uses must only allow the process data to be unambiguously distinguished from the non-process data, i.e. the other data contained in the data stream. For this purpose, for example, the protocol must unambiguously predetermine the position of process data in the data stream and the position of non-process data. Alternatively or additionally, if the process data is not always at the same position in the data stream, the protocol must make it possible to determine the position of the process data using other information in the data stream. It is necessary to determine the position of the process data in the data stream so that the process data may be selected from the data stream.

The first unit can be designed as a first logic circuit and the second unit can be designed as a second logic circuit. These first and second logic units are adapted to be operated independently of one another. Thus, the two logic circuits may perform different computational operations at the same time. This is achieved by a separate hardware implementation of the first and second logic circuits.

The first unit can be adapted to receive a serial data stream from the fieldbus and output a serial data stream on the fieldbus. The second unit is adapted to output a serial data stream on the local bus and receive a serial data stream from the local bus. The first and second units are preferably adapted to convert the serial data stream into a parallel data stream. The first and second units are preferably connected to the data management unit via a respective parallel bus. These parallel buses may be designed as 32-bit parallel buses. Thus, in the device according to the invention, the symbols of the respective data streams are forwarded in parallel. The respective parallel buses may also be sections of a single parallel bus.

The above-mentioned object is also accomplished by a method for transferring data between a fieldbus and a local bus, in particular a ring bus, with at least one data bus subscriber being connected to the local bus. The method according to the invention comprises receiving data over the fieldbus at a first unit, the received data containing first symbols; transferring the first symbols in a sequence-dependent manner to a second unit; and sending a data packet containing the first symbols on the local bus from the second unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
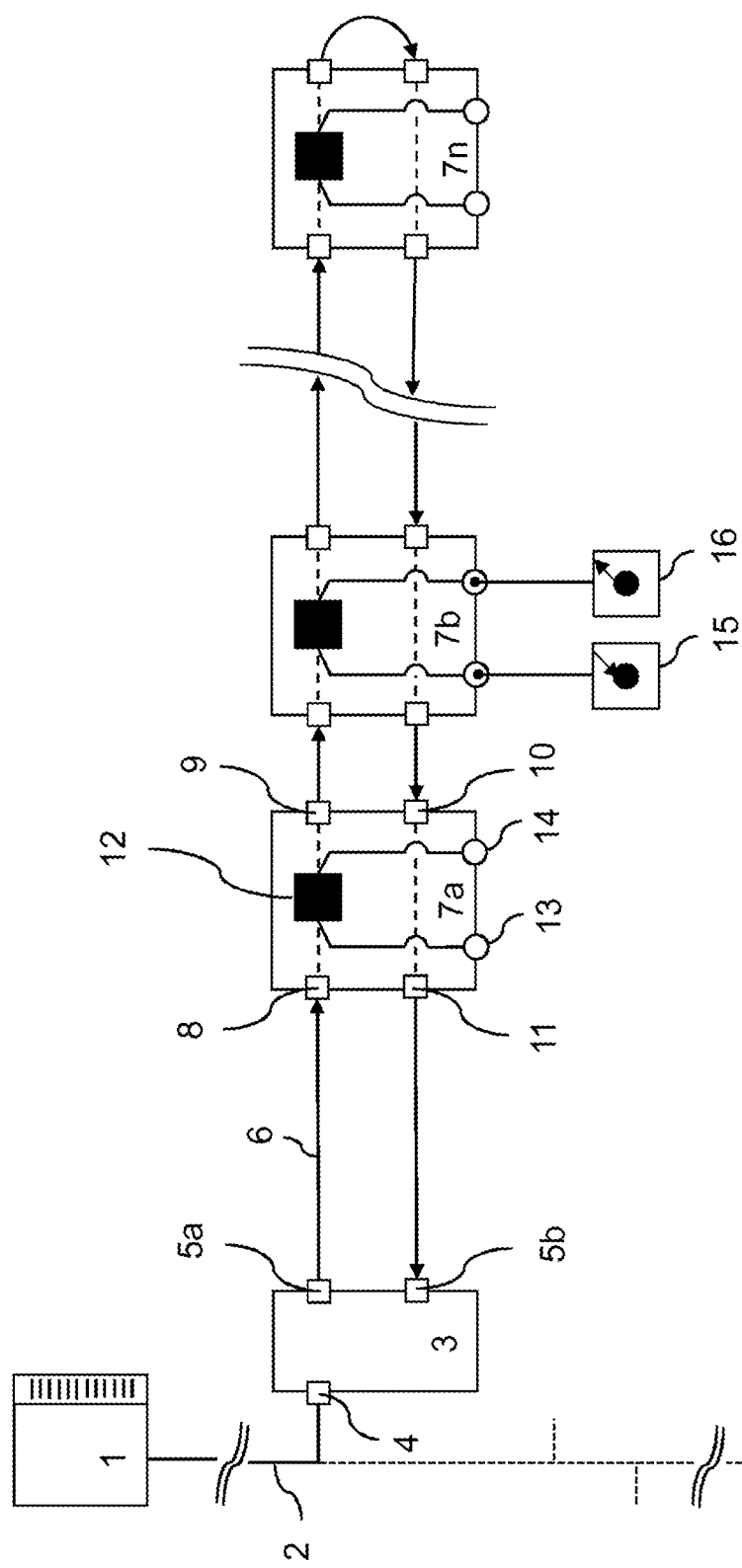
FIG. 1 is a schematic block diagram of an exemplary automation system with a programmable logic controller, a fieldbus, an exemplary embodiment of the device according to the invention, and an exemplary ring bus.

FIG. 1 shows a schematic block diagram of an automation system. The skilled person understands that the automation system shown is only exemplary, and that all elements, modules, components, subscribers and units belonging to the automation system may be designed differently but may still fulfil the basic functionalities described herein.

The automation system shown in FIG. 1 has a higher-level controller 1, which may be implemented, for example, using a programmable logic controller (PLC). A PLC 1 of this type is basically used to control and regulate the process that the automation system carries out. Currently, however, PLCs 1 used in automation systems also perform more extensive functions, such as for example visualization, alarming and recording all data relating to the process; as such, the PLC 1 functions as a human-machine interface. There are PLCs 1 in different performance classes that have different resources (computing capacity, memory capacity, number and type of inputs and outputs, and interfaces) that enable the PLC 1 to control and regulate the process of the automation system. A PLC 1 usually has a modular structure and formed of individual components, each of which fulfils a respectively different task. A PLC 1 usually formed of a central computer assembly (with one or more main processors and memory modules) and a plurality of assemblies with inputs and outputs.

Such modularly-structured PLCs 1 may readily be extended by adding assemblies. In this case, which assemblies must be integrated into the PLC 1 will depend on the complexity of the process and the complexity of the structure of the automation system. In contemporary automation systems, the PLC 1 is usually no longer an independent system; instead, the PLC 1 is connected to an internet or intranet via corresponding interfaces. As a result, the PLC 1 is part of a network via or from which the PLC 1 may receive information, instructions, programming and the like. For example, the PLC 1 may receive information about materials supplied to the process via a connection to a computer located in an intranet or internet, so that, for example, the process may be optimally controlled by knowing the number or nature thereof. It is also conceivable that a user may control the PLC 1 by accessing it from an intranet or internet. For example, a user may use a computer, also known as a host computer, to access the PLC 1 and check, change or correct the PLC's user programming. Accordingly, the PLC 1 may be accessed from one or more remote maintenance or control stations. The host computers may have visualization devices for representing process workflows.

To control the process of the automation system, the PLC 1 is connected to automation devices. Bus systems are used for these connections to minimize wiring effort. In the exemplary embodiment shown in FIG. 1, the PLC 1 is connected to a local bus master 3 of a lower-level local bus system via a higher-level bus 2, which in the exemplary embodiment shown here may be a fieldbus. However, not only a local bus master 3 of a local bus as in the exemplary embodiment shown here, but also any other subscribers that are designed to communicate with the PLC 1, may be connected to the higher-level bus 2.

In the exemplary embodiment shown here, the higher-level bus 2 is connected to the local bus master 3. To this end, the local bus master 3 has a first interface 4 that is designed in such a way that it may be connected to the higher-level bus 2.

For this purpose, the interface 4 may, for example, have a receptacle in the form of a socket, and the higher-level bus 2 may have a plug that the socket may accommodate. For example, the plug and socket may be a modular plug and modular socket, with each core of the higher-level bus 2 being electrically or optically connected to a connection in the modular socket. However, the skilled person is also familiar with other options for designing an interface 4 so that the local bus master 3 may be electrically or optically connected to the higher-level bus 2. The skilled person is familiar with screw, bearing, click or plug connections that may be used to establish an electrical or optical connection. A male plug is usually accommodated by a female counterpart. This accommodation usually not only establishes the electrical or optical connection, but also ensures that the two parts are mechanically coupled and may only be separated from one another by applying a certain force. However, it is also possible that the higher-level bus 2 may be permanently wired to the interface 4.

The local bus master 3 in the exemplary embodiment shown here has an additional second interface to connect the local bus master 3 to the local bus. Data bus subscribers 7a, 7b, . . . , 7n are connected to or form the local bus. The local bus is advantageously designed in such a way that a data packet sent by the local bus master 3 is transmitted back to the local bus master 3 by all the data bus subscribers 7a, 7b, . . . , 7n connected to the local bus. In this case, a data bus subscriber 7a, 7b, . . . , 7n always receives only a part of the data packet the data bus subscriber 7a, 7b, . . . , 7n upstream of it. After a time period in which the data bus subscriber 7a, 7b, . . . , 7n may process the data contained in this part, it forwards the part to the downstream data bus subscriber 7a, 7b, . . . , 7n, and at the same time receives a new part of the data packet from the upstream data bus subscriber 7a, 7b, . . . , 7n. In this way, all parts of the data packet pass sequentially through all the data bus subscribers 7a, 7b, . . . , 7n. The local bus is advantageously designed with a ring-shaped structure. Such local buses may also be referred to as ring buses 6. The local bus may alternatively be designed to be stranded or star-shaped, or to have a combination or mixture of the above designs. In this case, the data packets are sent and received via the second interface of the local bus master 3.

In the exemplary embodiment shown here, the second interface is divided into a first part 5a and a second part 5b. The first part 5a of the second interface establishes the downstream connection in the ring bus 6 and the second part 5b of the second interface establishes the upstream connection in the ring bus 6.

In the exemplary embodiment shown here, the ring bus 6, the data transmission direction of which is shown with arrows in the exemplary embodiment of FIG. 1, has data bus subscribers 7a, 7b, . . . , 7n. In the exemplary embodiment shown here, these data bus subscribers 7a, 7b, . . . , 7n each have a respective interface 8 in order to receive data from an upstream or preceding data bus subscriber 7a, 7b, . . . , 7n. Data bus subscriber 7a receives data from the upstream local bus master 3 via the interface 8. In addition, in the exemplary embodiment shown here, the data bus subscribers 7a, 7b, . . . , 7n each respectively have an interface 9 in order to forward data to a downstream or subsequent data bus subscriber 7a, 7b, . . . , 7n. Data bus subscriber 7a sends data to the downstream data bus subscriber 7b via the interface 9. The interfaces 8 and 9 are used to propagate data in the downstream direction of the ring bus 6, i.e. away from the local bus master 3. Moreover, in this exemplary embodiment the data bus subscribers 7a, 7b, . . . , 7n also have interfaces 10 and 11 for propagating data in the upstream direction of the ring bus 6, i.e. toward the local bus master 3. In the case of the data bus subscriber 7a, the interface 10 is designed to receive data from the downstream or subsequent data bus subscriber 7b, and the interface 11 is designed to forward data to the upstream or preceding data bus subscriber, in this case the local bus master 3. Thus, it may also be said that the interfaces 9 and 11 are transmitter interfaces, while the interfaces 8 and 10 are receiver interfaces.

In the exemplary embodiment shown here, the connections of the interfaces and the PLC 1 or the data bus subscribers 7a, 7b, . . . , 7n are implemented with the aid of cables or printed circuit boards by direct or indirect contacting using electrical contacts. Another alternative is that the individual connections are established wirelessly and the interfaces provide the necessary conversions for the radio standards used.

Although in the exemplary embodiment shown here, the local bus master 3 and the individual data bus subscribers 7a, 7b, . . . , 7n are shown spaced apart from one another, i.e. the local bus master 3 is arranged decentrally from the data bus subscribers 7a, 7b, . . . , 7n, the skilled person understands that the data bus subscribers 7a, 7b, 7n and the local bus master 3—which also represents a data bus subscriber of the ring bus 6—may also be directly connected together. In this case, for example, contacts of one data bus subscriber may access corresponding receptacles or receiving contacts of a directly adjacent data bus subscriber in order to establish an electrical connection between the data bus subscribers so that data may be sent in the downstream and upstream directions. For example, the data bus subscribers 7a, 7b, ..., 7n may have receptacles on the side facing away from the master and contacts on the side facing toward the master. If the data bus subscribers 7a, 7b, ..., 7n are then connected in sequence accordingly, the contacts of the one data bus subscriber 7a, 7b, ..., 7n each engage in the respective receptacles of the other data bus subscriber 7a, 7b, ..., 7n and an electrical connection may be established. The local bus master 3 in this case correspondingly has contacts on the side that engage with the receptacles of the first data bus subscriber 7a in order to establish an electrical connection between the interfaces 5a and 8 or the interfaces 5b and 11. However, the skilled person is also familiar with other possibilities for establishing an electrical or optical connection between two data bus subscribers 7a, 7b, ..., 7n arranged directly next to one another, for example pressure contacts and knife and fork contacts.

If it is desired that the data bus subscribers 7a, 7b, ..., 7n and the local bus master 3 are directly connected together, they may also have mechanical mountings or mechanical fasteners using which the individual data bus subscribers 7a, 7b, ..., 7n and the local bus master 3 may be connected to one another. For example, a data bus subscriber 7a, 7b, ..., 7n may have a projection on one side and an undercut on the other.

If the data bus subscribers 7a, 7b, ..., 7n are then connected in sequence, a projection engages in an undercut of the other data bus subscriber 7a, 7b, ..., 7n, so that a mechanical coupling occurs. For straightforwardly sequentially arranging the data bus subscribers 7a, 7b, ..., 7n, they may also be arranged on a shared mounting, for example a top-hat rail. The data bus subscribers 7a, 7b, ..., 7n may have appropriate fasteners for fastening onto the top-hat rail. Alternatively or additionally, the data bus subscribers 7a, 7b, ..., 7n may also, for example, have detachably connectable fasteners with which the data bus subscribers 7a, 7b, ..., 7n may be fastened either to the top-hat rail or to another mounting. For this purpose, the detachably connectable fasteners may be replaceable and a corresponding fastener for the desired mounting may be connected to the data bus subscribers 7a, 7b, ..., 7n so that these may be fastened to the desired mounting.

In addition, the data bus subscribers 7a, 7b, ..., 7n in the exemplary embodiment shown in FIG. 1 also have a processing unit 12. This processing unit 12 may be an arithmetic-logic unit or another type of computing unit that may be used to process data. The processing unit 12 is preferably an integral part of the data bus subscriber 7a, 7b, ..., 7n, in order to ensure particularly rapid and time-synchronized processing of the data.

The processing unit 12 may also be described as the complete circuit of the data bus subscriber. In other words, the processing device 12 receives data via the inputs 8 and 10 and transmits data via the outputs 9 and 11. In addition, the processing device 12 may receive or output data from the inputs/outputs 13 and 14. In addition, the processing unit 12 has access to a memory of the data bus subscriber 7a, 7b, ..., 7n in which, for example, data, process data or instruction lists are stored.

The processing unit 12 may be designed to process received data and to output data. Data for processing may be received either from an upstream data bus subscriber or from inputs 13 of the data bus subscriber 7a, 7b, ..., 7n. The inputs 13 of the data bus subscriber 7a, 7b, ..., 7n may in this case be connected to sensors 15 that for example send measurement data, status data, and the like.

Processed data may be output either to a downstream data bus subscriber or to outputs 14 of the data bus subscriber 7a, 7b, ..., 7n. The outputs 14 of the data bus subscriber 7a, 7b, ..., 7n may be connected to actuators 16, that for example carry out a certain action using the data directed to them. If data processing also takes place in the upstream direction, data may also be received from a downstream data bus subscriber 7a, 7b, ..., 7n and processed data may be sent to an upstream data bus subscriber 7a, 7b, ..., 7n.

For the sake of simplicity, the data bus subscribers 7a, 7b, ..., 7n are only shown with one input 13 and one output 14 in the exemplary embodiment shown here, and only data bus subscriber 7b is connected to a sensor 15 and actuator 16. However, the skilled person understands that the data bus subscribers 7a, 7b, ..., 7n may have a multiplicity of inputs and outputs 13 and 14, and may be connected to a multiplicity of different sensors 15 and actuators 16. The characteristic feature of the sensors 15 is that the sensors 15 receive data or signals and send them to the data bus subscribers 7a, 7b, ..., 7n, while the actuators 16 receive data or signals from the data bus subscribers 7a, 7b, ..., 7n and perform an action based on these data or signals.

Alternatively, the interfaces 8, 9, 10 and 11 may be integrated in a module unit and the data bus subscribers 7a, 7b, ..., 7n may be plugged into this module unit. The module units may also be described as basic elements of the ring bus 6. The ring bus infrastructure is set up by the module units and the data bus subscribers 7a, 7b, ..., 7n are replaceable, so that the ring bus 6 may be set up with any arbitrary data bus subscribers 7a, 7b, ..., 7n. The module units also serve to ensure that communication between the remaining data bus subscribers 7a, 7b, ..., 7n is not interrupted even if a data bus subscriber 7a, 7b, ..., 7n is removed, because communication takes place via the remaining module units. The data bus subscribers 7a, 7b, ..., 7n shown in this exemplary embodiment are often referred to as I/O modules, due to their inputs and outputs 13, 14, which may be connected to sensors 15 or actuators 16.

Although the data bus subscribers 7a, 7b, ..., 7n are shown as spatially separated from the sensors 15 or actuators 16 in the exemplary embodiment shown here, the sensors 15 or actuators 16 may also be integrated into the I/O module.

The ring bus 6 shown in this exemplary embodiment is based on cycle frame communication.

For example, a cycle frame may be defined as a recurring (cyclic), preferably equidistant, time interval in which data may be transferred on the ring bus 6. For example, the cycle frame has at least a start identifier (SOC) and a time range for transmitting data. A plurality of start identifiers (SOC) of successive cycle frames are advantageously offset equidistantly in time. The aforementioned time range is intended for transmitting the data packets that may be transmitted in the form of data packets within the cycle frame. The start identifier (SOC) and data packets are transmitted via the ring bus 6 and pass through all data bus subscribers 7a, 7b, ..., 7n. Advantageously, the cycle frame is initiated by the local bus master 3 in the ring bus 6. The start identifier (SOC) is separate, i.e. may be transferred as an independent symbol or may be advantageously contained in a start data packet (SOC packet).

Zero, one or more data packets are transferred within the time range of the cycle frame. Advantageously, idle data is inserted in a cycle frame, in particular adjoining at least one data packet. Advantageously the transmission of the data packets and/or the idle data causes an uninterrupted signal on the ring bus 6. The signal enables the data bus subscribers 7a, 7b, . . . , 7n to temporally synchronize themselves to the signal.

Advantageously, the cycle frame additionally has a trailer. The trailer has a variable length and follows the time range for data transmission, preferably up to the next start identifier (SOC) of the next cycle frame. Advantageously, the trailer has idle data. Each data packet is sent in a downstream direction from the local bus master 3 to the first data bus subscriber 7a of the ring bus 6. This subscriber receives a first part of the data packet via the interface 8.

Such a part of the data packet is also referred to below as a "piece" or "unit." The data bus subscriber 7a then carries out a processing operation on the part, and then forwards the part to the next data bus subscriber 7b via the interface 9; preferably at the same time, the first data bus subscriber 7a receives a second part of the data packet, and so forth. The size of the parts of the data packet, i.e. the chunking of the data packet, depends on the receiving capacity of the data bus subscribers 7a, 7b, . . . , 7n; for example, a fixed number of bits, for example 8 bits of the data packet, may be simultaneously available for processing at the data bus subscriber 7a, 7b, . . . , 7n.

Accordingly, the data packet passes through the data bus subscribers 7a, 7b, . . . , 7n in units, chunks or parts, for example in parts or symbols of 8 bits. The part of the data packet that the last data bus subscriber has processed (in the exemplary embodiment shown here, data bus subscriber 7n), then passes through the ring bus 6 in the upstream direction, so that the parts starting from the last data bus subscriber 7n are again sent upstream in the direction of local bus master 3 by all data bus subscribers 7a, 7b, . . . , 7n. For this purpose, the last data bus subscriber 7n either has a switchable bridge that connects interface 9 with interface 10 or a switchable bridge is connected to the last data bus subscriber 7n, which assumes the function of forwarding the parts of the data packet from the interface 9 to the interface 10. Alternatively, the interface 10 of the data bus subscriber 7n may also be connected directly to the interface 5b of the local bus master 3 using a bypass line.

In the upstream direction, the units of the data packet or data packets may be looped back to the local bus master 3 by the individual data bus subscribers 7a, 7b, . . . , 7n, as in the exemplary embodiment shown here, without further processing. However, it is also conceivable that in the upstream direction the units of the data packet are processed again, so that the data packet may be processed twice, once in the downstream direction to the last data bus subscriber 7n and once in the upstream direction to the local bus master 3. For example, processing may take place in the upstream direction by signal refreshing and/or phase shifting.

When processing the data packets in the downstream direction, i.e. away from the local bus master 3, or in the upstream direction, i.e. toward the local bus master 3, the processing is performed using instruction lists, and the instruction lists contain sets of instructions that the processing unit 12 of the data bus subscribers 7a, 7b, . . . , 7n may execute. The instruction lists themselves may be sent to the individual data bus subscribers 7a, 7b, . . . , 7n an initialization phase by the local bus master 3 or may advantageously be sent to the data bus subscribers 7a, 7b, . . . , 7n during the ongoing communication, so that the data bus subscribers 7a, 7b, . . . , 7n are programmed without interrupting the communication.

An instruction list index may be used to communicate to the data bus subscribers 7a, 7b, . . . , 7n which of the instruction lists the data bus subscribers 7a, 7b, . . . , 7n should use. This instruction list index informs the data bus subscriber which stored instruction list it should use. An instruction list index is thus mapped to an instruction list or vice versa, so that the instruction list index may be used to identify the instruction list to use. For this purpose, the instruction list index preferably has a value that is associated with an instruction list; for example, the value indicates a specific instruction list or its location in memory. For this purpose, the value itself may be the memory address where the instruction list is stored, or where at least one first instruction of the instruction list is stored. Alternatively or additionally, the value may also refer to a memory area in which the corresponding instruction list is stored. The term "direct mapping" may also be used in the cases mentioned above. The value of the instruction list index may also be used, for example, as an entry in a lookup table (LUT). The value of the instruction list index is the input value of the lookup table. The output value of the lookup table may be the memory address of the first instruction in the associated instruction list or may otherwise identify the instruction list. The lookup table may be stored as software or as hardware, in the form of for example logic circuits, and may indicate a bijective mapping from an input value to an output value, with the output value providing an indication of the instruction list to be used.

How a relationship is established between the instruction list index and the instruction list is a function of the lookup table. The use of a lookup table may also be referred to as "indirect mapping." In the case of direct and indirect mapping, however, the instruction list for the data bus subscriber to use is bijectively identifiable, i.e. locatable, via the instruction list index. The instruction list index may be inserted into the data packet before the process data that will be processed, so that the data bus subscribers 7a, 7b, . . . , 7n may use the corresponding instruction list that corresponds to the sequence of process data in the data packet. These instruction lists comprise instructions that are adapted to the sequence of the process data in the data packet. For example, the instruction lists may contain a "SKIP" instruction for process data that is not directed to the data bus subscriber 7a, 7b, . . . , 7n, i.e. they may instruct the data bus subscriber 7a, 7b, . . . , 7n to skip the corresponding part of the data packet, while in contrast the instruction list for process data directed to the data bus subscriber 7a, 7b, . . . , 7n may comprise corresponding instructions for processing the process data. The processing of the process data may thus be decoupled from the actual position of the process data in the data packet, because the instruction lists serve to adapt the data bus subscribers to the sequence of the process data in the data packet.

In the exemplary embodiment shown here, the local bus master 3 is used for converting between the higher-level bus 2, which may also be referred to as a fieldbus, and the ring bus 6. The device responsible for the conversion in the local bus master 3 is shown in FIG. 2.

Figure 2:
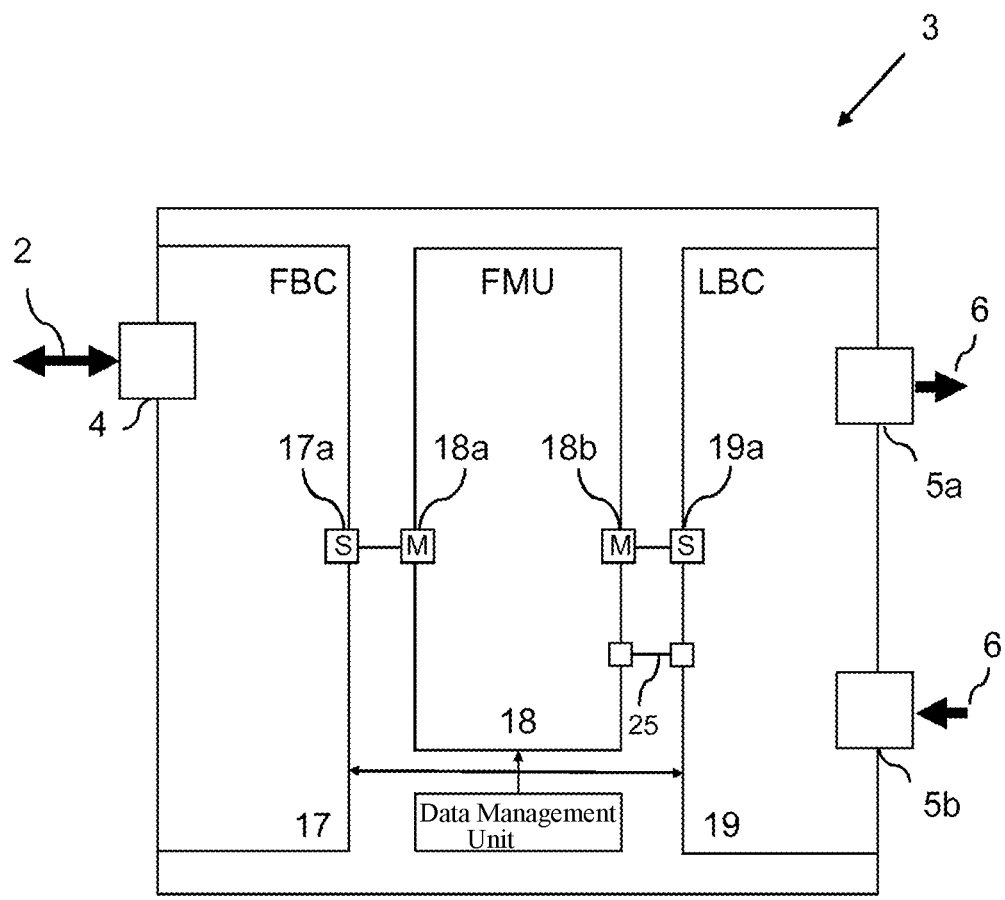
FIG. 2 is a schematic block diagram of an exemplary embodiment of the device according to the invention.

FIG. 2 shows a block diagram of an exemplary embodiment of the device according to the invention, arranged in the local bus master 3. The local bus master 3 is connected to the fieldbus 2 via the interface 4 and is connected to the ring bus 6 via the interface 5. Accordingly, the interface 4 may also be referred to as the fieldbus interface, and the interface 5 may be referred to as the local bus interface.

For processing the data streams received or the data streams to be sent via these interfaces, processing units may be connected to the interfaces 4,5; in this case a first unit 17 that may also be referred to as a fieldbus core (FBC) may be connected to the fieldbus interface 4, and a second unit 19 that may also be referred to as a local bus core (LBC) may be connected to the local bus interface 5.

The FBC 17 and LBC 19 are connected to a data management unit 18 via a parallel bus. The parallel bus may be a 32-bit parallel bus and may also be connected to a computing unit such as for example a microcontroller, µC or a processor capable of controlling the FBC 17, data management unit 18, and LBC 19.

The data management unit 18 is adapted to transfer first symbols from the FBC 17 to the LBC 19 sequence-dependently, for example in unchanged sequence, so that they may be sent to the ring bus 6 via the local bus interface 5, contained in at least one data packet. These first symbols may be process data received at the FBC 17 via the fieldbus 2 and via the interface 4. The LBC 19 may be adapted to generate successive, local bus-compliant data packets for transmitting the process data on the local bus 6, and to insert the process data received from the data management unit 18 into the corresponding data packet. The order of the process data may be retained, i.e. the process data in the data packet on the local bus may have the same sequence as the sequence in which the process data was received at the FBC 17 via the fieldbus interface 4. In other words, fieldbus telegrams of the fieldbus 2 are received at the FBC 17 via the fieldbus interface 4, the fieldbus telegrams comprise process data in the form of first symbols with a fixed number of bits, for example 8 bits, i.e. 1 byte. These first symbols are arranged in the fieldbus telegram in a first sequence. The data management unit 18 is adapted to copy the process data from the FBC 17 to the LBC 19. The LBC 19 is adapted to generate a data packet of the local bus 6, wherein the data packet contains the first symbols of the process data in a second sequence and wherein the first sequence and second sequence of the symbols coincide.

The data bus subscribers 7a, 7b, . . . , 7n are designed to evaluate the process data in the data packet by means of instruction lists and an instruction list index. For this purpose, the instruction list index, for example, is prepended to the process data in the data packet. Conversely, the data management unit 18 is adapted to sequence-dependently transfer second symbols from the LBC 19 to the FBC 17, for example unchanged, so that they may be sent to the fieldbus 2 via the fieldbus interface 4. These second symbols were received at the LBC 19 from the local bus 6 via the local bus interface 5. If the local bus 6 is a ring bus, then the local bus interface 5 is divided into two parts, namely parts 5a and 5b, and data is transmitted downstream via part 5a to the local bus 6 and received upstream via part 5b from the local bus 6.

The data management unit 18 also has a first and a second master interface 18a and 18b in the exemplary embodiment shown here. The first master interface 18a is connected to a slave interface 17a of the FBC 17. In other words, the data management unit 18 and the FBC 17 are in a master-slave relationship, in this case the control system starts from the data management unit 18. The data management unit 18 thus reads data from the FBC 17 or writes data to the FBC 17 at a time that the data management unit 18 predetermines. The second master interface 18b of the data management unit 18 is connected to a slave interface 19a of the LBC 19. The data management unit 18 and the LBC 19 also have a master-slave relationship. Thus, the data management unit 18 controls the transfer of data between the FBC 17 and the LBC 19, in particular in both directions.

In addition, the data management unit 18 and the LBC 19 in the exemplary embodiment shown here are connected via an additional line 25, and validity information may be exchanged between the data management unit 18 and the LBC 19 regarding the transferred symbols via this additional line 25. This validity information may then be used to delay the transmission of the first and second symbols to the fieldbus 2 or local bus 6.

Advantageously, the connections between the units are designed as buses. A bus in this case may advantageously be a 32-bit parallel bus. Alternatively, the connection may be any other connection that allows the above-described data transfer between the units.

Figure 3A:
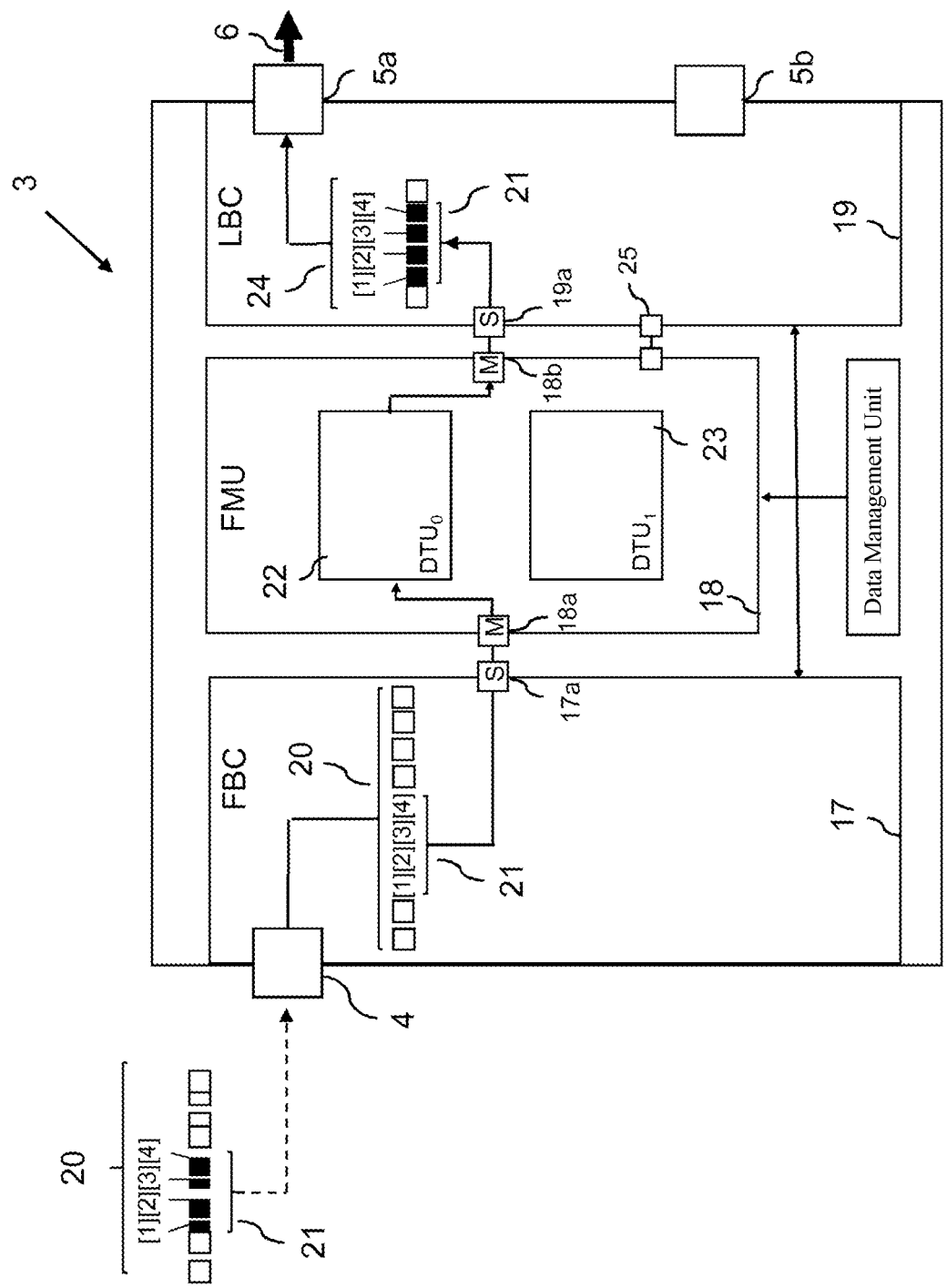
FIG. 3a is a schematic block diagram of an exemplary embodiment of the device according to the invention, having first symbols transferred from the fieldbus to the ring bus.

FIG. 3a shows a schematic block diagram of an exemplary embodiment of the device according to the invention, implemented in a local bus master 3 of a ring bus 6. In the exemplary embodiment shown here, the first interface 4 of the local bus master 3 receives a fieldbus telegram 20 from the fieldbus 2. This fieldbus telegram 20, by way of example, contains 10 bytes, represented by square boxes, each box representing 1 byte, i.e. 8 bits. Only the four black boxes, which correspond to 4 bytes, contain the first process data 21. The other 6 bytes of the fieldbus telegram 20 are information corresponding to the bus protocol used on the fieldbus 2. However, these additional 6 bytes do not carry any process data 21 that is necessary for controlling or regulating the process; this additional information is only bus-specific information, such as for example addressing information, checksum information, and the like. The first process data 21 are here also marked as [1], [2], [3] and [4], which symbolizes their sequence. The first process data 21 are selected from the fieldbus telegram 20 by the FBC 17 and are stored for example in a buffer. The selection may include the FBC 17 transferring only the process data 21 in a buffer, but ignoring the additional bytes of the fieldbus telegram 20.

In the exemplary embodiment shown here, the data management unit 18 has a first data transfer unit 22 that reads the process data 21 from the buffer of the FBC 17 via the master-slave interface connection 17a, 18a and writes the process data 21 into a buffer of the LBC 19 via the master-slave interface connection 18b, 19a. Thus, the first data transfer unit 22 copies process data 21 from the FBC 17 to the LBC 19. The copying may be done according to instructions and the first data transfer unit 22 may be adapted to prepend and/or append further data to the process data 21 and/or interpolate it between the process data 21. Alternatively or additionally, the LBC 19 may be adapted to prepend and/or append additional data to the process data 21 and/or interpolate the additional data between the process data 21 and/or modify the process data 21.

For example, the additional data from the LBC 19 may be used to convert the process data 21 into a local bus-compliant format, for example into a data packet that may be sent to the local bus 6. In the exemplary embodiment shown here, a symbol is respectively prepended and a symbol is respectively appended to the process data 21, to generate a data packet 24 that carries the process data 21. The skilled person understands that although in this case only one symbol is prepended and appended to the process data 21, any arbitrary number of symbols may also be prepended and/or appended and that this depends solely on which data packet format is used on the local bus 6. The first data transfer unit 22 may additionally be adapted to communicate the validity of the process data 21 to the LBC 19 after copying the process data 21 to the LBC 19. The validity may be communicated via the connection 25. Only when the LBC 19 receives a signal that the copied process data 21 is valid may the LBC 19 send this data downstream on the local bus 6 via the local bus interface 5*a*. The validity of the process data 21 is determined, for example, by a CRC or a valid bit.

The skilled person understands that parts of the data packet 24 that the LBC 19 generates may also be sent on the local bus 6 before receiving the validity indication. In particular, if the parts of the data packet 24 pass successively through the data bus subscribers 7*a*, 7*b*, . . . , 7*n* as shown in FIG. 1, the local bus master 3 at any given time sends only a part of the data packet 24, which the individual data bus subscribers 7*a*, 7*b*, . . . , 7*n* then forward. In this case, the LBC 19 may send the part of the data packet 24 containing the process data or other information on the local bus 6 before receiving the validity indication. In the exemplary embodiment shown here, the LBC 19 may send the appended symbol on the local bus 6 in advance, as the first part of the data packet 24.

The first data transfer unit 22 thus copies process data 21 from the fieldbus 2 to the local bus 6. During this copy process, the sequence [1], [2], [3], [4] of process data 21 is retained, i.e. the sequence of the process data 21 is the same in the fieldbus telegram 20 and in the data packet 24 of the local bus 6. The process data 21 is copied bus-neutrally, i.e. without the bus-specific information with which the process data 21 is received.

In the exemplary embodiment shown here, the two prepended symbols and the four appended symbols of the fieldbus telegram 20 are not copied.

Figure 3B:
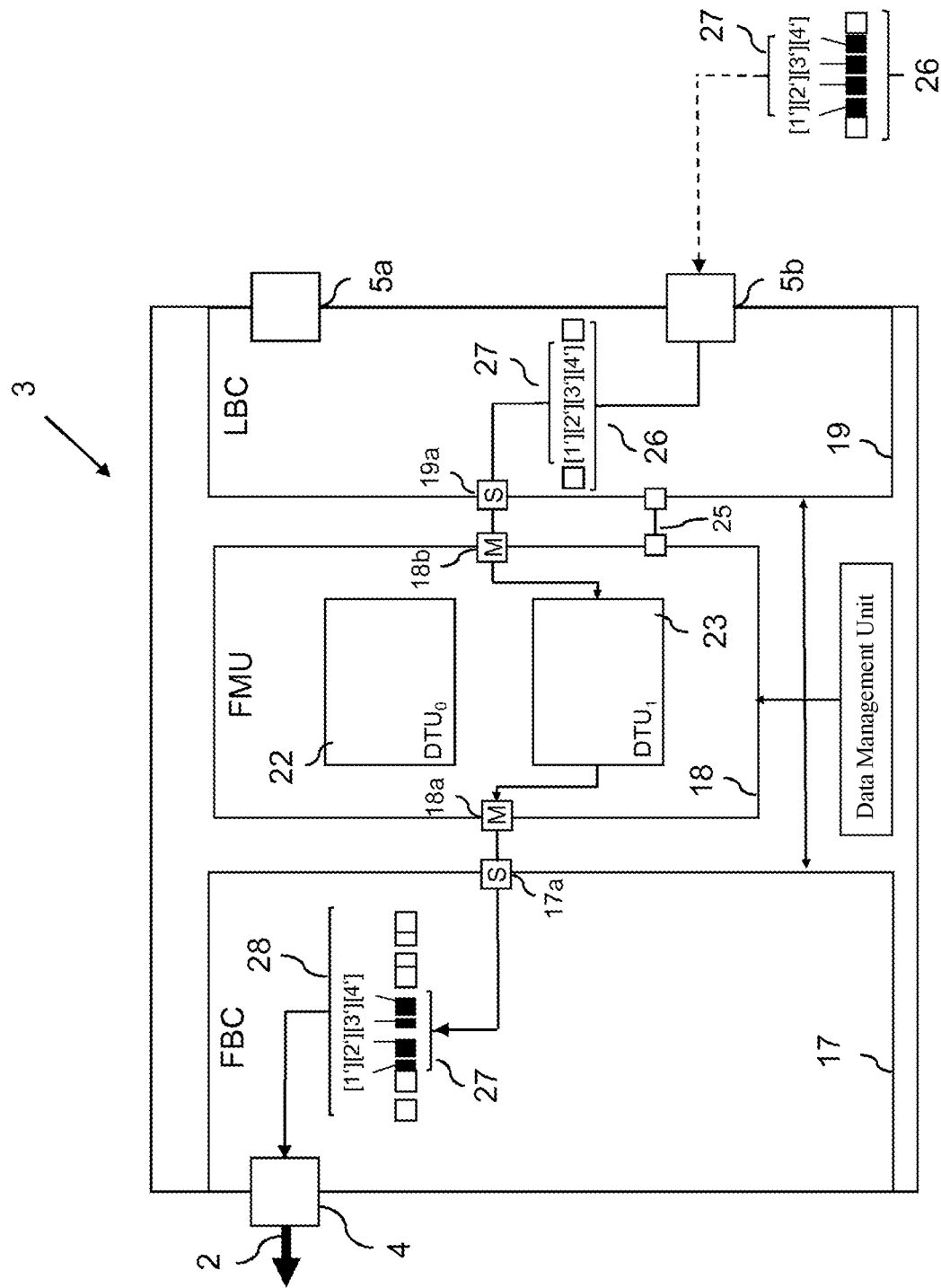
FIG. 3b is a schematic block diagram of an exemplary embodiment of the device according to the invention with second symbols transferred from the ring bus to the fieldbus.

FIG. 3*b* shows a schematic block diagram of an exemplary embodiment of the device according to the invention, implemented in a local bus master 3 of a ring bus 6. In the exemplary embodiment shown here, the second interface 5*b* of the local bus master 3 receives a data packet 26. The data packet 26, by way of example, contains 6 bytes, which are represented by square boxes, each box representing 1 byte, i.e. 8 bits. Only the four black boxes, which correspond to 4 bytes, contain the second process data 27. The other 2 bytes of the data packet 26 are information corresponding to the bus protocol used on the local bus 6. The second process data 27 are here also marked as [1'], [2'], [3'] and [4'], which symbolizes their order in the sequence. The second process data 27 may be based on the first process data 21—as shown in FIG. 3*a*—and may represent the process data 21 after it has passed through, i.e. been processed by, the local bus 6. The process data 27 is selected from the data packet 26 of the LBC 19 and for example stored in a buffer. The selection may include the fact that the LBC 19 only transfers the process data 27 in a buffer, but ignores the additional bytes of the data packet 26.

In the exemplary embodiment shown here, the data management unit 18 comprises a second data transfer unit 23 that reads the process data 27 from the buffer of the LBC 19 via the master-slave interface connection 18*b*, 19*a* and then writes the process data 27 into a buffer of the FBC 17 via the master-slave interface connection 17*a*, 18*a*. In other words, the second data transfer unit 23 copies process data 27 from the LBC 19 to the FBC 17. The copying may be done according to instructions and the second data transfer unit 23 may be adapted to prepend and/or append additional data to the process data 27 and/or interpolate such data between the process data 27.

Alternatively or additionally, the FBC 17 may be adapted to prepend and/or append additional data to the process data 27 and/or interpolate it between the process data 27. For example, the additional data from the FBC 17 may be used to convert the process data 27 into a fieldbus-compliant format, for example into a fieldbus telegram 28 of the fieldbus 2.

In the exemplary embodiment shown here, two symbols are prepended to the process data 27 and four symbols are appended, so as to generate a fieldbus telegram 28 that carries the process data 27. The skilled person understands that although in this case only a specific number of symbols are prepended and appended to the process data 27, this may also be any number of symbols; the number depends solely on the fieldbus telegram format used on the fieldbus 2. The second data transfer unit 23 may additionally be adapted to copy only part of the process data 27 to the FBC 17 and only to copy the remaining process data 27 after receiving a validity indication from the LBC 19 via the connection 25. As a result, the second data transfer unit 23 may control the time at which the FBC 17 sends the fieldbus telegram 28, because the fieldbus telegram 28 is always sent immediately when it has been completely filled with process data 27. If this is not yet the case, no fieldbus telegram 28 is yet sent. This allows a control system between the second data transfer unit 23 and the FBC 17 without any additional connection being necessary. The validity of the process data 27 is determined based on a CRC.

The components of the device according to the invention that have been described as separate units, modules or interfaces in the described exemplary embodiment may be implemented as separate hardware, but or may be integrated onto the same semiconductor chip, and their function may be implemented by a hardware arrangement of logic gates. For example, the units, modules, or interfaces may be implemented on an FPGA/ASIC.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for coupling a fieldbus to a local bus for connecting to at least one data bus subscriber, the local bus being a ring bus, the device comprising:
   a field bus core connectable to the fieldbus and adapted to send and receive data via the fieldbus;
   a local bus core connectable to the local bus and adapted to send and receive data via the local bus in at least one data packet; and
   a data management unit connected to the field bus core and the local bus core, the data management unit being adapted to transfer first symbols from data received via the field bus core to the local bus core in a sequence-dependent manner such that the first symbols are transferred to the local bus core in a same sequence in which the symbols are received from the field bus core; and
   the local bus core being adapted to generate and send local-bus compliant data packets including the first symbols on the local bus.

2. The device according to claim 1, wherein the data management unit is adapted to prepend and/or append additional symbols to the first symbols.

3. The device according to claim 1, wherein the data management unit is adapted to temporarily store the first symbols.

4. The device according to claim 1, wherein the local bus core is adapted to generate the local-bus compliant data packets comprising the first symbols and to send the local-bus compliant data packets on the local bus.

5. The device according to claim 1, wherein the local bus core is adapted to receive the local-bus compliant data packets from the local bus, and
wherein the local-bus compliant data packets contains second symbols.

6. The device according to claim 1, wherein the local bus core is additionally adapted to manipulate the first symbols.

7. The device according to claim 4, wherein cycle times of a cycle frame for the local-bus compliant data packets are adapted to the cycle times of the fieldbus.

8. The device according to claim 1, wherein the data management unit comprises a first master interface that is connected to a slave interface of the field bus core, and/or
wherein the data management unit comprises a second master interface that is connected to a slave interface of the local bus core.

9. The device according to claim 8, wherein the data management unit comprises a first data transfer unit, and
wherein the first data transfer unit is adapted to read the first symbols from a buffer of the field bus core via the first master interface based on first instructions, and write these symbols into a buffer of the local bus core via the second master interface.

10. The device according to claim 9, wherein the data management unit is adapted to send the received first symbols to the local bus core via the second master interface using the first data transfer unit when a validity of the received first symbols is indicated.

11. The device according to claim 1, wherein the data management unit comprises a second data transfer unit, and
wherein the second data transfer unit is adapted to read second symbols from a buffer of the local bus core via the second master interface based on second instructions, and to write these symbols into a buffer of the field bus core via the first master interface.

12. The device according to claim 11, wherein the data management unit is adapted to write the second symbols into the buffer of the field bus core via the first master interface using the second data transfer unit when a validity of the second symbols is indicated.

13. The device according to claim 1, further comprising a computing unit adapted to control the field bus core and/or the data management unit and/or the local bus core and/or to evaluate the first symbols.

14. The device according to claim 1, wherein the field bus core is adapted to check the validity of the data packets received via the fieldbus, and the local bus core is adapted to check the validity of the local-bus compliant data packets received via the local bus.

15. The device according to claim 1, wherein the field bus core is adapted for serial sending and receiving of data via the fieldbus,
wherein the local bus core is adapted for serial sending and receiving of data via the local bus,
wherein the data management unit is connected to the field bus core via a parallel bus, and
wherein the data management unit is connected to the local bus core via a parallel bus.

16. The device according to claim 1, wherein the field bus core is a first logic circuit for communication with the fieldbus,
wherein the local bus core is a second logic circuit for communication with the local bus, and
wherein the first logic circuit and the second logic circuit are adapted to perform computational operations independently of one another.

17. The device according to claim 1, wherein the symbols include process data.

18. The device according to claim 1, wherein the field bus is a higher level bus than the local bus.

19. A method for transferring data between a fieldbus and a local bus, in particular a ring bus, wherein at least one data bus subscriber is connected to the local bus, the method comprising:
receiving data at a first unit via the fieldbus, the received data having first symbols;
transferring the first symbols sequence-dependently into a second unit, such that the first symbols are transferred to the second unit in a same sequence in which the symbols are received from the first unit; and
generating and sending local-bus compliant data packets on the local bus from the second unit, including the first symbols.

* * * * *